United States Patent
Katayama et al.

(10) Patent No.: US 12,246,292 B2
(45) Date of Patent: Mar. 11, 2025

(54) MICRO OR NANO POROUS MEMBRANE, MANUFACTURING METHOD OF SAME, POROUS RESIN MEMBRANE COMPLEX, AND FILTER ELEMENT

(71) Applicant: SUMITOMO ELECTRIC INDUSTRIES, LTD., Osaka (JP)

(72) Inventors: Hirokazu Katayama, Osaka (JP); Fumihiro Hayashi, Osaka (JP); Yasuhiro Okuda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 774 days.

(21) Appl. No.: 17/049,431

(22) PCT Filed: May 8, 2019

(86) PCT No.: PCT/JP2019/018340
§ 371 (c)(1),
(2) Date: Oct. 21, 2020

(87) PCT Pub. No.: WO2019/220960
PCT Pub. Date: Nov. 21, 2019

(65) Prior Publication Data
US 2021/0260536 A1 Aug. 26, 2021

(30) Foreign Application Priority Data
May 15, 2018 (JP) ................... 2018-094025

(51) Int. Cl.
*B01D 71/36* (2006.01)
*B01D 67/00* (2006.01)
(Continued)

(52) U.S. Cl.
CPC ....... *B01D 71/36* (2013.01); *B01D 67/00041* (2022.08); *B01D 67/0027* (2013.01);
(Continued)

(58) Field of Classification Search
CPC ............... B01D 71/36; B01D 67/0004; B01D 67/0027; B01D 69/02; B01D 69/10;
(Continued)

(56) References Cited

U.S. PATENT DOCUMENTS

| | | | | |
|---|---|---|---|---|
| 5,506,281 A | * | 4/1996 | Muhlbauer | ........... C08F 259/08 525/902 |
| 2014/0045031 A1 | * | 2/2014 | Matsumoto | ......... H01M 50/426 429/144 |

(Continued)

FOREIGN PATENT DOCUMENTS

| JP | H11-240918 | 9/1999 |
|---|---|---|
| JP | 2013-237808 | 11/2013 |

(Continued)

OTHER PUBLICATIONS

English language machine translation of JP2013237808, 12 pages, No Date.*

*Primary Examiner* — Pranav N Patel
(74) *Attorney, Agent, or Firm* — IPUSA, PLLC

(57) ABSTRACT

The present disclosure relates to a micro or nano porous membrane composed of a stretched membrane of a fluororesin membrane, wherein the fluororesin membrane contains sintered bodies of a plurality of core-shell particles containing fluororesins, wherein the core-shell particles include cores and shells covering outer surfaces of the cores, wherein an average particle size of the core-shell particles before being sintered is greater than or equal to 100 nm and less than or equal to 1,000 nm, wherein a ratio of a volume of the shells to a volume of the cores in the core-shell particles before being sintered is greater than or equal to 2/98 and less than or equal to 50/50, wherein a fluororesin of the cores is a tetrafluoroethylene-hexafluoropropylene copolymer, a tetrafluoroethylene-perfluoroalkyl vinyl ether copolymer or a combination thereof, and a fluororesin of the
(Continued)

shells is polytetrafluoroethylene, and wherein a first heat of fusion of the fluororesins in the core-shell particles is less than or equal to 68 J/g.

6 Claims, 2 Drawing Sheets

(51) Int. Cl.
  *B01D 69/02* (2006.01)
  *B01D 69/10* (2006.01)
(52) U.S. Cl.
  CPC ........... *B01D 69/02* (2013.01); *B01D 69/107* (2022.08); *B01D 2323/12* (2013.01); *B01D 2325/04* (2013.01); *B01D 2325/20* (2013.01); *B01D 2325/32* (2013.01)
(58) Field of Classification Search
  CPC ............ B01D 2323/12; B01D 2325/02; B01D 2325/04; B01D 2325/20; B01D 2325/32; B01D 67/002; B01D 67/0025; B01D 71/76; B01D 71/32; Y02E 60/10; B32B 5/24; C08J 9/00
  See application file for complete search history.

(56) References Cited

U.S. PATENT DOCUMENTS

| 2014/0083929 A1 | 3/2014 | Hayashi et al. |
| 2015/0021814 A1* | 1/2015 | Aten ................. C08L 27/18 |
| | | 264/234 |
| 2015/0079392 A1* | 3/2015 | Hayashi ................ C08J 9/24 |
| | | 210/500.36 |

FOREIGN PATENT DOCUMENTS

| WO | 2005/061567 | 7/2005 |
| WO | 2005/066402 | 7/2005 |
| WO | 2013/111690 | 8/2013 |
| WO | 2013/153989 | 10/2013 |

* cited by examiner

MICRO OR NANO POROUS MEMBRANE, MANUFACTURING METHOD OF SAME, POROUS RESIN MEMBRANE COMPLEX, AND FILTER ELEMENT

TECHNICAL FIELD

The present disclosure relates to a micro or nano porous membrane, a manufacturing method of the same, a porous resin membrane complex, and a filter element. The present application is based on and claims priority to Japanese Patent Application No. 2018-094025, filed on May 15, 2018, the entire contents of the Japanese Patent Application being hereby incorporated herein by reference. The present application incorporates the entire contents of Japanese Laid-open Patent Publication No. 2013-237808 published on Nov. 28, 2013 and International Publication Pamphlet No. WO 2005/066402 published internationally on Jul. 21, 2005.

BACKGROUND ART

A micro or nano porous membrane that is a membrane-shaped porous body that is mainly made of a fluororesin such as polytetrafluoroethylene and having a fine pore size is used as a filtration membrane (filter) or the like to remove fine particles because it is excellent in chemical resistance and heat resistance.

As a method of manufacturing a micro or nano porous membrane, a method of shaping fluororesin particles into a membrane shape, heating the shaped product to a melting point or higher to be sintered to obtain a non-porous membrane material, and stretching it to be porous is known. As such fluororesin particles, a method of using a powder of modified polytetrafluoroethylene and using, as the modified polytetrafluoroethylene, one whose heat of fusion is less than or equal to a specific value (see Japanese Laid-open Patent Publication No. 2013-237808) and for fluororesin particles as described above, a method of using one having a structure in which the inside is composed of polytetrafluoroethylene and the outer surface side is composed of polytetrafluoroethylene having a lower heat of fusion than the polytetrafluoroethylene, a tetrafluoroethylene/hexafluoropropylene copolymer, or a tetrafluoroethylene/perfluoroalkyl ether copolymer (International Publication Pamphlet No. WO 2013/153989) are considered.

PRIOR ART DOCUMENT

Patent Documents

[Patent Document 1] Japanese Laid-open Patent Publication No. 2013-237808
[Patent Document 2] International Publication Pamphlet No. WO 2013/153989

SUMMARY OF THE INVENTION

According to one aspect of the present disclosure, a micro or nano porous membrane is composed of a stretched membrane of a fluororesin membrane, wherein the fluororesin membrane contains sintered bodies of a plurality of core-shell particles containing fluororesins, wherein the core-shell particles include cores and shells covering outer surfaces of the cores, wherein an average particle size of the core-shell particles before being sintered is greater than or equal to 100 nm and less than or equal to 1,000 nm, wherein a ratio of a volume of the shells to a volume of the cores in the core-shell particles before being sintered is greater than or equal to 2/98 and less than or equal to 50/50, wherein a fluororesin of the cores is a tetrafluoroethylene-hexafluoropropylene copolymer, a tetrafluoroethylene-perfluoroalkyl vinyl ether copolymer or a combination thereof, and a fluororesin of the shells is polytetrafluoroethylene, and wherein a first heat of fusion of the fluororesins in the core-shell particles is less than or equal to 68 J/g.

According to another one aspect of the present disclosure, a method of manufacturing a micro or nano porous membrane includes: a step of shaping a plurality of core-shell particles containing fluororesins into a membrane shape; a step of sintering the plurality of core-shell particles by heating a membrane obtained by the step of shaping to its melting point or more; and a step of stretching a fluororesin membrane obtained by the step of sintering, wherein the core-shell particles include cores and shells covering outer surfaces of the cores, wherein an average particle size of the core-shell particles before the step of sintering is greater than or equal to 100 nm and less than or equal to 1,000 nm, wherein a ratio of a volume of the shells to a volume of the cores in the core-shell particles before the step of sintering is greater than or equal to 2/98 and less than or equal to 50/50, wherein a fluororesin of the cores is a tetrafluoroethylene-hexafluoropropylene copolymer, a tetrafluoroethylene-perfluoroalkyl vinyl ether copolymer or a combination thereof, and a fluororesin of the shells is polytetrafluoroethylene, and wherein a first heat of fusion of the fluororesins in the core-shell particles is less than or equal to 68 J/g.

According to another one aspect of the present disclosure, a porous resin membrane complex includes: a porous support; and the micro or nano porous membrane fixed on the support.

According to another one aspect of the present disclosure, a filter element includes the porous resin membrane complex.

Here, the "first heat of fusion" is a value that is obtained by dividing the endothermic energy (J) obtained by integration of the section between the temperature (X° C.), which is at the end of the endothermic curve according to the temperature profile (Pattern 1) in which the core-shell particles are heated at a rate of 10° C./minute from room temperature to 365° C., and X−48° C. by the mass (g) of the fluororesins in the core-shell particles.

Also, the "average particle size" is a value calculated using dynamic light scattering.

EMBODIMENT FOR CARRYING OUT THE INVENTION

Figure 1:
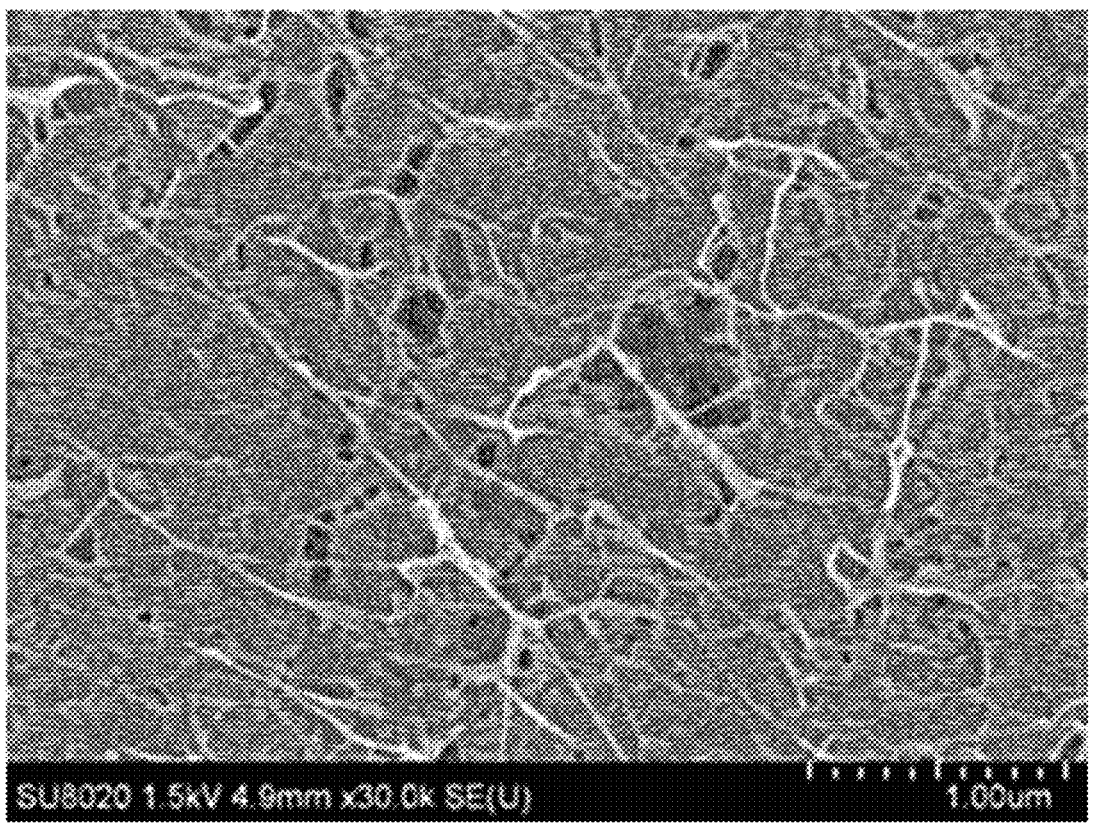
FIG. 1 is an electron micrograph of the surface of a No. 1 micro or nano porous membrane in Example.

Problem to Be Solved by the Present Disclosure

Because a conventional micro or nano porous membrane as described above has a small porosity, in a case of being used as a filtration membrane, there is a disadvantage that the permeate flow rate is small.

In view of the above, the present disclosure has an object to provide a micro or nano porous membrane having a large permeate flow rate.

Effect of the Present Disclosure

The micro or nano porous membrane according to one aspect of the present disclosure has a large permeate flow rate. A method of manufacturing a micro or nano porous membrane according to another one aspect of the present disclosure enables to easily and reliably manufacture a micro or nano porous membrane having a large permeate flow rate. A porous resin membrane complex according to another one aspect of the present disclosure can enhance the mechanical strength while maintaining the permeate flow rate of the micro or nano porous membrane. A filter element according to another one aspect of the present disclosure is enables to remove fine foreign matter with high efficiency.

DESCRIPTION OF EMBODIMENTS OF THE PRESENT DISCLOSURE

According to one aspect of the present disclosure, a micro or nano porous membrane is composed of a stretched membrane of a fluororesin membrane, wherein the fluororesin membrane contains sintered bodies of a plurality of core-shell particles containing fluororesins, wherein the core-shell particles include cores and shells covering outer surfaces of the cores, wherein an average particle size of the core-shell particles before being sintered is greater than or equal to 100 nm and less than or equal to 1,000 nm, wherein a ratio of a volume of the shells to a volume of the cores in the core-shell particles before being sintered is greater than or equal to 2/98 and less than or equal to 50/50, wherein a fluororesin of the cores is a tetrafluoroethylene-hexafluoropropylene copolymer (which may be hereinafter referred to as "FEP"), a tetrafluoroethylene-perfluoroalkyl vinyl ether copolymer (which may be hereinafter referred to as "PFA") or a combination thereof, and a fluororesin of the shells is polytetrafluoroethylene (which may be hereinafter referred to as "PTFE"), and wherein a first heat of fusion of the fluororesins in the core-shell particles is less than or equal to 68 J/g.

The micro or nano porous membrane is a stretched fluororesin membrane. The fluororesin membrane is obtained by depositing and sintering the core-shell particles containing fluororesins. The fluororesin of the cores of the core-shell particles FEP and/or PFA. The fluororesin of the shells is PTFE. In the present disclosure, using the core-shell particles having physical properties as described above, by the cores being FEP and/or PFA, and the shells being homo-PTFE, FEP and/or PFA to be the origins for forming pores can be more uniformly arranged. As a result, it is believed that the micro or nano porous membrane can form a larger number of more uniform micro or nano porous and increase the permeate flow rate.

In the micro or nano porous membrane, it is preferable that the permeability index, represented by (membrane thickness (μm)×air permeability rate (mL/sec/cm$^2$))/(average equivalent circle diameter of pores (μm))$^2$ is greater than or equal to 100. According to the micro or nano porous membrane as described above, it is possible to further increase the permeate flow rate.

According to another one aspect of the present disclosure, a method of manufacturing a micro or nano porous membrane includes: a step of shaping a plurality of core-shell particles containing fluororesins into a membrane shape; a step of sintering the plurality of core-shell particles by heating a membrane obtained by the step of shaping to its melting point or more; and a step of stretching a fluororesin membrane obtained by the step of sintering, wherein the core-shell particles include cores and shells covering outer surfaces of the cores, wherein an average particle size of the core-shell particles before the step of sintering is greater than or equal to 100 nm and less than or equal to 1,000 nm, wherein a ratio of a volume of the shells to a volume of the cores in the core-shell particles before the step of sintering is greater than or equal to 2/98 and less than or equal to 50/50, wherein a fluororesin of the cores is a tetrafluoroethylene-hexafluoropropylene copolymer, a tetrafluoroethylene-perfluoroalkyl vinyl ether copolymer or a combination thereof, and a fluororesin of the shells is polytetrafluoroethylene, and wherein a first heat of fusion of the fluororesins in the core-shell particles is less than or equal to 68 J/g.

According to the method of manufacturing the micro or nano porous membrane, by depositing the core-shell particles in which the fluororesin of the cores is FEP and/or PFA and the fluororesin of the shells is PTFE and stretching the fluororesin membrane obtained by sintering, it is possible to easily and reliably manufacture a micro or nano porous membrane having a large permeate flow rate.

It is preferable that the permeability index of the micro or nano porous membrane, represented by (membrane thickness (μm)×air permeability rate (mL/sec/cm$^2$))/(average equivalent circle diameter of pores (μm))$^2$ is greater than or equal to 100. In this manner, according to the method of manufacturing the micro or nano porous membrane, it is possible to manufacture the micro or nano porous membrane with a larger permeate flow rate.

A porous resin membrane complex according to another one aspect of the present disclosure includes a porous support and the micro or nano porous membrane fixed on the porous support. The porous resin membrane complex according can enhance the mechanical strength while maintaining the permeate flow rate of the micro or nano porous membrane.

A filter element according to another one aspect of the present disclosure includes the porous resin membrane complex. The filter element enables to remove fine foreign matter with high efficiency.

DETAILS OF EMBODIMENTS OF THE PRESENT DISCLOSURE

In the following, a micro or nano porous membrane, a manufacturing method of a micro or nano porous membrane, a porous resin membrane complex, and a filter element according to an embodiment of the present disclosure will be described in detail.

<Micro or Nano Porous Membrane>

The micro or nano porous membrane is composed of a stretched membrane of a fluororesin membrane (hereinafter, which may be referred to as a "fluororesin membrane (X)"). The fluororesin membrane (X) contains sintered bodies of a plurality of core-shell particles (which may be hereafter referred to as "core-shell particles (A)") containing fluororesins.

Examples of a method of obtaining a stretched membrane of the fluororesin membrane (X) that is the micro or nano porous membrane include a method such as a stretching method in a step of stretching of a method of manufacturing a micro or nano porous membrane, which will be described later below. Examples of a method of obtaining the sintered bodies of the core-shell particles (A) in the fluororesin membrane (X) include a method such as a sintering method in a step of sintering of a method of manufacturing a micro or nano porous membrane, which will be described later below.

(Core-Shell Particles (A))

The core-shell particles (A) include cores containing a fluororesin (which may be hereinafter referred to as "cores (a)") and shells covering the outer surfaces of the cores (a) and containing a fluororesin (which may be hereinafter referred to as "shells (b)").

The lower limit of the average particle size of the core-shell particles (A) before being sintered is 100 nm, is preferably 150 nm, and is more preferably 200 nm. The upper limit of the average particle size is 1,000 nm, is preferably 800 nm, and is more preferably 600 nm. By setting the average particle size of the core-shell particles (A) in the range as described above, the permeate flow rate of the micro or nano porous membrane can be further increased.

The lower limit of the ratio of the volume of the shells (b) to the volume of the cores (a) in the core-shell particles (A) before being sintered is 2/98, is preferably 5/95, and is more preferably 10/90. The upper limit of the ratio is 50/50, is preferably 40/60, and is more preferably 30/70. By setting the volume ratio of the cores to the shells in the core-shell particles (A) in the range as described above, the permeate flow rate of the micro or nano porous membrane can be further increased.

In core-shell particles (A), the fluororesin of cores (a) is FEP, PFA, or the combination thereof, and the fluororesin of the shells (b) is PTFE.

FEP is a copolymer of tetrafluoroethylene (which may be hereinafter referred to as "TFE") and hexafluoropropylene (which may be hereinafter referred to as "HEP"), and is represented by the formula (I) below.

PFA is a copolymer of TFE and perfluoroalkylvinyl ether (which may be hereinafter referred to as "PAVE") and is represented by the formula (II) below. In the formula (II), Rf is a perfluoroalkyl group.

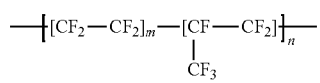

(I)

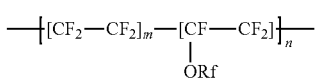

(II)

The lower limit of m in the structure formula (I) and the structure formula (II) is preferably 1, and is more preferably 5. The upper limit of the m is preferably 500 and is more preferably 400.

In the structure formula (I) and the structure formula (II), n represents the degree of polymerization. The range of n is not particularly limited, but the lower limit of n is preferably 100 and is more preferably 500. The upper limit of the n is preferably 4,000 and is more preferably 2,000.

Examples of the perfluoroalkyl group represented by Rf include a trifluoromethyl group, a pentafluoroethyl group, a heptafluoropropyl group, and the like. Among these, a heptafluoropropyl group is preferable.

PTFE is a polymer of TFE.

For the PTFE, a small amount of monomers other than TFE, HEP, and PAVE may be polymerized to the extent not detracting from the effects of the present disclosure.

The lower limit of the weight average molecular weight (Mw) of PTFE is preferably 100,000 and is more preferably 200,000. The upper limit of the Mw is preferably 50 million and is more preferably 30 million. In the specification of the present application, Mw is a value calculated from the first heat of fusion measured by a differential scanning calorimeter.

These copolymers may be made by copolymerizing, to HFP or PAVE, small amounts of other monomers other than TFE, HFP and PAVE, to the extent not detracting from the effects of the present disclosure. These copolymers may also be made by copolymerizing both HFP and PAVE with TFE.

The upper limit of the first heat of fusion of the fluororesins in the core-shell particles (A) is 68 J/g, is preferably 60 J/g, and is more preferably 55 J/g. The lower limit of the first heat of fusion is preferably 20 J/g and is more preferably 30 J/g. By setting the first heat of fusion of the fluororesins in the range as described above, the permeate flow rate of the micro or nano porous membrane can be further increased.

The fluororesin membrane (X) contains sintered bodies of the core-shell particles (A). The sintered bodies are obtained, for example, by a step of sintering, which will be described later below. The fluororesin membrane (X) containing the sintered bodies is usually a non-porous membrane.

The micro or nano porous membrane according to the present disclosure is a stretched membrane of the fluororesin membrane (X) described above. For a method of obtaining the stretched membrane, it is possible to employ a step of stretching, which will be described later below. In the present disclosure, it is preferably uniaxial stretching. Also, the upper limit of the stretching rate is preferably 8-fold and is more preferably 4-fold.

The lower limit of the average thickness of the micro or nano porous membrane is preferably 0.1 μm and is more preferably 0.5 μm. The upper limit of the average thickness is preferably 100 μm and is more preferably 80 μm.

The lower limit of the average maximum diameter of the pores in the micro or nano porous membrane is preferably 20 nm and is more preferably 30 nm. The upper limit of the average maximum diameter is, for example, 120 nm.

The "average maximum diameter of the pores" means the average value of the maximum diameters of the individual pores.

The lower limit of the average equivalent circle diameter of the pores in the micro or nano porous membrane is preferably 20 nm and is more preferably 25 nm. The upper limit of the average equivalent circle diameter is, for example, 100 nm. The "average equivalent circle diameter of the pores" means the average value calculated by "$2\times(\text{pore area}/n)^{1/2}$" from the areas of the respective individual pores.

The lower limit of the area rate of the pores in the micro or nano porous membrane is preferably 1% and is more preferably 3%. The upper limit of the area rate of the pores is not particularly limited, but is preferably 20% and is more preferably 10%. The "area rate of the pores" is the value (%) calculated by "the total area of the pores in the field of view×100/the area of the entire field of view" from the areas of the respective individual pores.

The maximum diameters of the respective individual pores and the areas of the respective individual pores that are used to calculate the average maximum diameter of the pores, the average equivalent diameter of the pores, and the area rate of the pores in the micro or nano porous membrane can be determined respectively by using a surface SEM photograph of the micro or nano porous membrane by a scanning electron microscope (SEM) and by image processing using image processing software.

The lower limit of the average flow diameter of the pores in the micro or nano porous membrane is preferably 20 nm and is more preferably 25 nm. The upper limit of the average flow diameter is preferably 100 nm and is more preferably 70 nm. The average flow diameter of the pores in the micro or nano porous membrane is a value that is measured by a method in accordance with ASTM F-316.

The upper limit of the Gurley in the micro or nano porous membrane is preferably 500 seconds, is more preferably 100 seconds, and is further more preferably 25 seconds. The lower limit of the Gurley is preferably 5 seconds and is more preferably 10 seconds. The Gurley in the micro or nano porous membrane is a value that is measured by a method in accordance with JIS-P8117 (2009).

The lower limit of the permeability rate of liquid isopropanol (IPA) at a differential pressure of 0.1 MPa of the micro or nano porous membrane is preferably 0.1 mL/min/cm$^2$ and is more preferably 1 mL/min/cm 2. The upper limit of the permeability rate is, for example, 10 mL/min/cm$^2$.

The lower limit of the permeability index of the micro or nano porous membrane is preferably 50, is more preferably 100, and is further more preferably 200. The upper limit of the permeability index is, for example, 10,000. The permeability index of the micro or nano porous membrane is a value that is represented by "(membrane thickness (μm)×air permeability rate (mL/sec/cm$^2$))/(average equivalent circle diameter of pores (μm))$^2$.

(Method of Manufacturing Core-shell Particles)

Core-shell particles (A) can be manufactured, for example, by manufacturing, through polymerization, a polymer to be cores, after this polymerization, and adding a monomer for forming a polymer to be shells to cause polymerization. Also, core-shell particles (A) can be manufactured by using particles of modified polytetrafluoroethylene as cores and forming shells of homo-PTFE on the surfaces of the cores. Particles of the modified polytetrafluoroethylene as cores are not particularly limited. For example, particles of modified polytetrafluoroethylene described in Japanese Laid-open Patent Publication No. 2013-237808 or the like can be used.

[Use]

The micro or nano porous membrane has a high permeate flow rate, the micro or nano porous membrane is preferably used as a filtration membrane to remove fine foreign matter, for example.

<Method of Manufacturing Micro or Nano Porous Membrane>

In the following, a method of manufacturing the micro or nano porous membrane will be described. The method of manufacturing the micro or nano porous membrane includes a step of shaping a plurality of core-shell particles (A) containing fluororesins into a membrane shape; a step of sintering the plurality of core-shell particles (A) by heating the membrane obtained by the step of shaping to its melting point or more; and a step of stretching the fluororesin membrane (X) obtained by the sintering step.

In the method of manufacturing the micro or nano porous membrane according to the present disclosure, the core-shell particles (A) that are used in the step of shaping into a membrane shape have an average particle of 100 nm or more and 1,000 nm or less before the step of sintering, the ratio of the volume of the shells (b) to the volume of the cores (a) in the core-shell particles (A) before the step of sintering is greater than or equal to 2/98 and less than or equal to 50/50, the fluororesin of the cores (a) is FEP, PFA, or the combination thereof, the fluororesin of the shells (b) is PTFE, and the first heat of fusion of the fluororesins in the core-shell particles (A) is less than or equal to 68 J/g.

The core-shell particles (A) are described as the core-shell particles (A) in the micro or nano porous membrane described above. In the following, each step will be described.

[Step of Shaping]

In this step, the core-shell particles (A) are shaped into a membrane shape.

This step can be carried out using, for example, a composition containing core-shell particles (A) (hereinafter which may be referred to as the "composition (P)").

The composition (P) may contain a water-soluble polymer such as polyethylene oxide or polyvinyl alcohol, a surfactant, and the like, together with the core-shell particles (A). The composition (P) usually contains an aqueous medium such as water.

This step can be performed, for example, by applying, on a smooth base material, the composition (P) into a membrane-shape using an applicator or the like, then heating it using a hot plate or the like, removing the aqueous medium or the like, and drying.

The smooth base material has a smoothness such that no pores or protrusions/recesses are observed on the surface to be in contact with the composition (P). The smooth base material is preferably a metal foil and is more preferably an aluminum foil because it is flexible and it is easily dissolved and removed by acid or the like after forming the membrane.

[Step of Sintering]

In this step, the plurality of core-shell particles (A) are sintered by heating the membrane obtained by the above step of shaping to its melting point of 344° C. or higher. In a case in which the composition (P) contains a water-soluble polymer such as polyethylene oxide or polyvinyl alcohol, a surfactant, or the like, these materials are also sintered in the step of sintering.

In the step of sintering, the lower limit of the temperature of the melting point or more in the heating is preferably 350° C. and is more preferably 370° C. The upper limit of the above temperature is preferably 440° C. and is more preferably 420° C. The lower limit of the heating time is preferably 10 seconds and is more preferably 1 minute. The upper limit of the above time is preferably 120 minutes and is more preferably 60 minutes.

In the step of sintering, it is preferable to apply an annealing treatment to the membrane after being heated. The temperature of the annealing treatment is, for example, greater than or equal to 300° C. and less than or equal to 330° C., and the time of the annealing treatment is, for example, greater than or equal to 0.1 hours and less than or equal to 48.

In this way, a fluororesin membrane (X) in which a plurality of core-shell particles (A) are sintered is obtained. The fluororesin membrane (X) is usually a non-porous membrane.

In the method of manufacturing the micro or nano porous membrane, the step of shaping and the step of sintering can be performed at the same time. That is, the core-shell particles (A) may be sintered by heating the membrane in the step of shaping at a temperature greater than or equal to the melting point.

[Step of Stretching]

In this step, the fluororesin membrane (X) obtained by the above step of sintering step is stretched.

The stretching of the fluororesin membrane (X) in this step can be performed under conditions similar to those for obtaining a conventional PTFE stretched membrane. The stretching is usually uniaxial stretching. The stretching may be performed at one stage or at multiple stages of two or more stages.

The upper limit of the stretching rate of the stretching is preferably 8-fold and is more preferably 4-fold. The stretching temperature is usually greater than or equal to 0° C. and less than or equal to 150° C.

The stretched membrane of the fluororesin membrane (X) obtained by the step of stretching is a membrane having fine pores (porous membrane).

<Porous Resin Membrane Complex>

The porous resin membrane complex includes a porous support and the micro or nano porous membrane described above fixed on the support.

The porous resin membrane complex is such that the micro or nano porous membrane described above is fixed on the porous support, and in addition to a high permeate flow rate, the porous resin membrane complex has excellent mechanical strength. The porous resin membrane complex is easily handled at the time of use or processing in comparison to the micro or nano porous porous membrane alone. Accordingly, the porous resin membrane complex can be suitably used as a filtration membrane for filtering fine particles.

The porous support imparts mechanical strength to the complex while when the complex is used as a filtration membrane, it is preferable not to inhibit the characteristics of the filtration membrane, such as processing capability and processing rate. As the porous support, a porous body made of PTFE, which is excellent in mechanical strength, chemical resistance, heat resistance, and the like, is preferably used, and the pore size thereof is preferably larger than the pore size of the micro or nano porous membrane combined with it, and the porosity is preferably high. Specifically, a porous body made of PTFE manufactured by stretching a PTFE membrane to form pores of 100 nm or more, preferably 200 nm or more, and having a thickness that provides sufficient mechanical strength is preferably used.

<Filter Element>

The filter element includes the porous resin membrane complex described above. Because the filter element uses the porous resin membrane complex described above, the permeate flow rate is large and the mechanical strength is excellent. Therefore, it is possible to remove fine foreign matter with high efficiency.

OTHER EMBODIMENTS

The embodiment disclosed above should be considered exemplary in all respects and not limiting. The scope of the present invention is not limited to configurations of the above described embodiment, but is indicated by claims and is intended to include all changes within the meaning and scope of equivalence with the claims.

EXAMPLES

In the following, the present disclosure will be described in more detail with reference to Examples, but the present disclosure is not limited to the following Examples.

[Method of Measuring Heat of Fusion of Fluororesins]

The measurement was conducted by a method described below using a differential scanning calorimeter ("DSC-60" manufactured by Shimadzu Corporation).

5-30 mg of Sample was heated at a rate of 10° C./min from room temperature to 365° C. (Pattern 1), then cooled at a rate of −1° C./min from 365° C. to 100° C. (Pattern 2), and then heated at a rate of 10° C./min from 100° C. to 380° C. (Pattern 3). Defining the ends of the endothermic curves according to the temperature profiles of Pattern 1 and Pattern 3 as the origins, the respective endothermic energies obtained by integration of the section of 48° C. were defined as the first heat of fusion and the second heat of fusion.

(Measurement Method of Average Particle Size Of Core-Shell Particles)

Using a particle distribution meter "NanoTrac Wave II-EX150" manufactured by MicrotracBEL, the average particle size D50 that is calculated from the volume cumulative distribution was defined as the average particle size.

[Manufacturing of Micro or Nano Porous Membrane]

(No. 1 Micro or Nano Porous Membrane)

(Synthesis of Core-Shell Particles)

Core-shell particles were synthesized with reference to the emulsion polymerization of Example 1 in International Publication Pamphlet No. 2005/066402. Thereby, a dispersion of core-shell particles (hereinafter, also referred to as "fluororesin particles (A)") in which the cores are PFA and the shells are PTFE was obtained. The concentration of solids of the fluororesin particles (A) in the obtained dispersion was 60% by mass.

(Preparation of Composition Containing Core-shell Particles)

46.4% by mass of the dispersion of the fluororesin particles (A) synthesized described above, 26.4% by mass of a polyethylene oxide solution 4% by mass, 0.8% by mass of a surfactant (MEGAFAC F-444 manufactured DIC Corporation), and 26.4% by mass of pure water were mixed to prepare a mixture liquid having the concentration of solids of 28% by mass such that the composition (P) was obtained.

Figure 3:
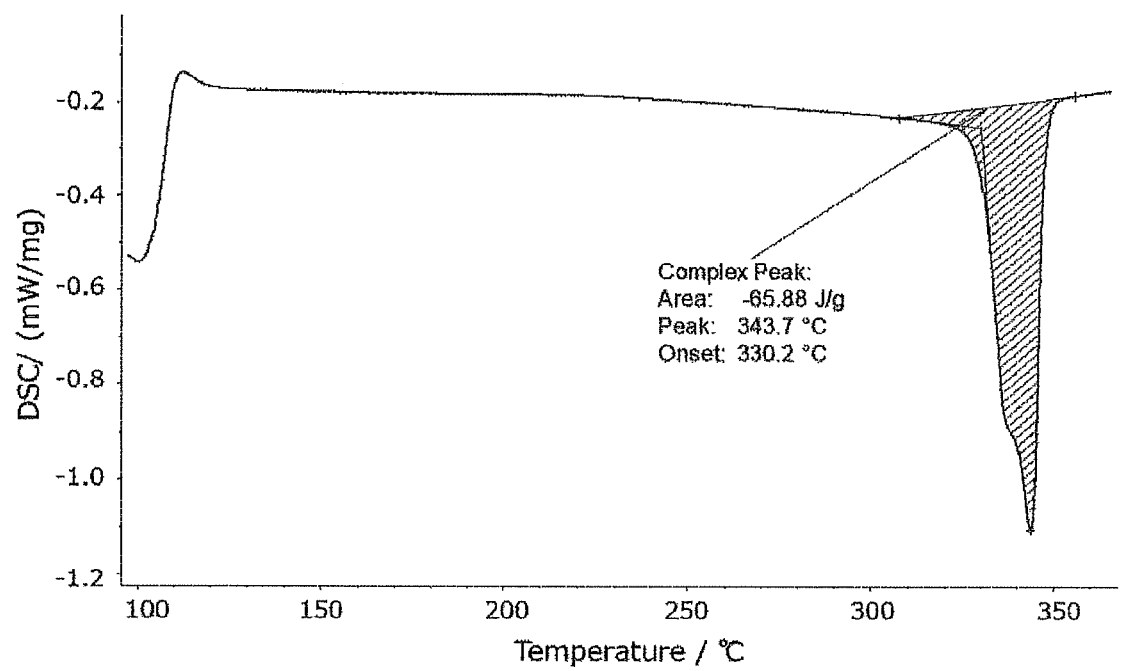
FIG. 3 is a chart illustrating a result of differential scanning calorimetry according to a temperature profile of pattern 1 of core-shell particles (A) in Example.
Figure 4:
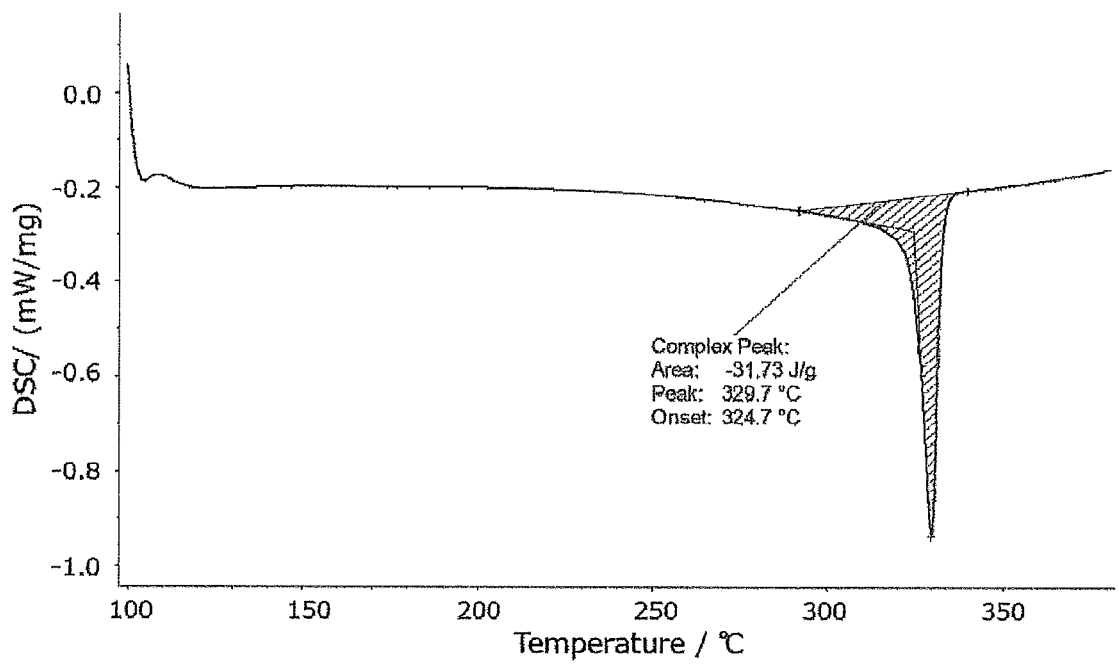
FIG. 4 is a chart illustrating a result of differential scanning calorimetry according to a temperature profile of pattern 4 of core-shell particles (A) in Example.

The first heat of fusion in the fluororesin particles (A) was 65.88 J/g as a result of calculating the endothermic energy through integration of the section between the temperature (X=356° C.) at the end of the endothermic curve according to the pattern 1 in FIGS. 3 and X−48° C. (=308° C.). Also, the second heat of fusion in the fluororesin particles (A) was 31.73 J/g as a result of calculating the endothermic energy through integration of the section between the temperature (X=340° C.) at the end of the endothermic curve according to the pattern 3 in FIG. 4 and X−48° C. (=292° C.). It should be noted that the average particle size of the fluororesin particles (A) was 230 nm.

(Step of Shaping)

Next, an aluminum foil having an average thickness of 50 μm (one-side glossy foil manufactured by UACJ Corporation) was extended and fixed on a flat glass plate so that wrinkles were not formed. The composition (P) prepared described above was dropped on the glossy surface. Thereafter, it was spread so as to be uniform over the entire surface of the aluminum foil by sliding a stainless steel slide shaft (Stainless fine shaft, SNSF-type, outer diameter: 20 mm) manufactured by Nippon Bearing Co., Ltd. This foil was heated at 60° C. for 60 minutes using a hot plate to form a coating membrane having an average thickness of 20 μm.

(Step of Sintering)

The aluminum foil with which the coating membrane was formed was maintained at 365° C. for 60 minutes using a thermostatic bath, and then cooled down from 365° C. to 200° C. over one hour to perform sintering. After this sintering, using a thermostatic bath, an annealing treatment was performed by maintaining it at 320° C. for 6 hours and then cooling down it from 365° C. to 200° C. over one hour. After this annealing treatment, the aluminum foil was dissolved and removed with hydrochloric acid to obtain the fluororesin membrane after the step of sintering.

(Step of Stretching)

The fluororesin membrane obtained by the step of sintering was cut into dimensions of 50 mm (in the stretching direction)×50 mm (in the width direction) and uniaxially stretched by 2.0-fold at 15° C. (initial chuck-to-chuck distance 30 mm, tensile speed 0.2 m/min, tensile distance 30 mm) using an autograph to obtain the No. 1 micro or nano porous membrane. An electron micrograph of the surface of the No. 1 micro or nano porous membrane is illustrated in FIG. 1.

(No. 2 Micro or Nano Porous Membrane)

Figure 2:
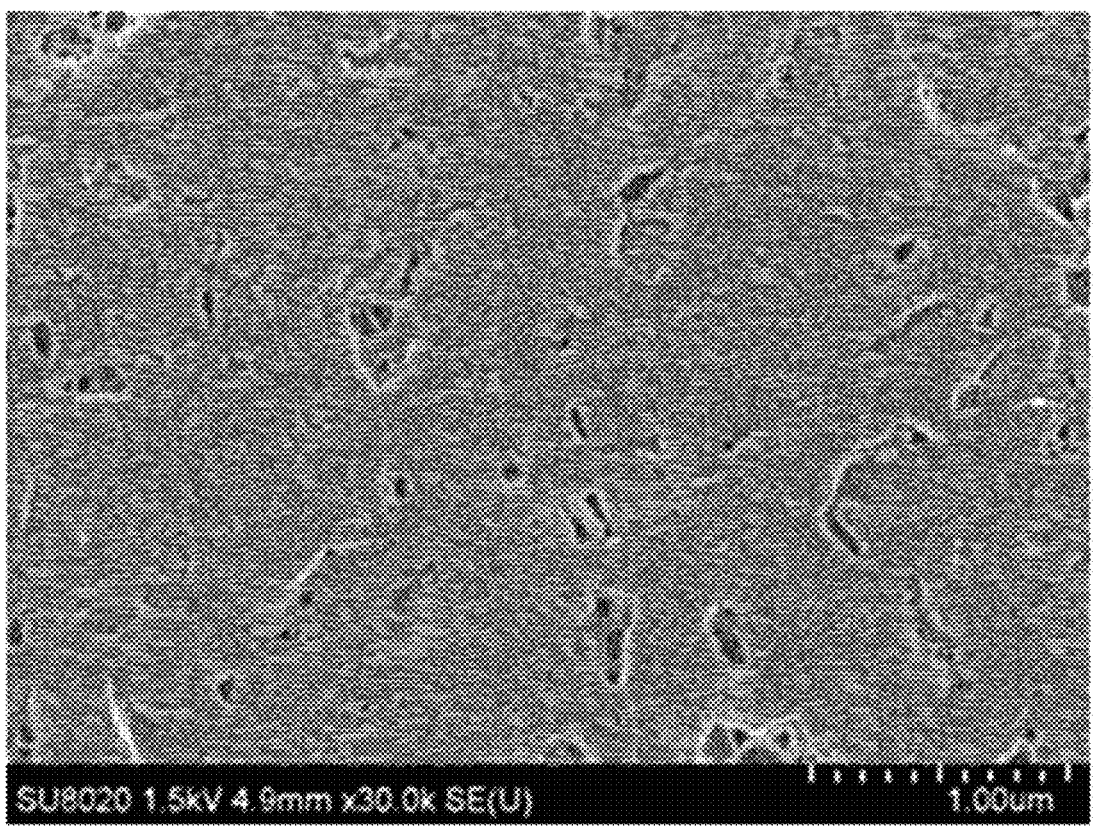
FIG. 2 is an electron micrograph of the surface of a No. 2 micro or nano porous membrane in Example.

Fluororesin particles (B) were obtained by a method described in Example 2 of Patent Document (Japanese Laid-open Patent Publication No. 2013-237808). Other than the above, a No. 2 micro or nano porous membrane was manufactured similarly to the manufacturing of the No. 1 micro or nano porous membrane. An electron micrograph of the surface of the No. 2 micro or nano porous membrane is illustrated in FIG. 2.

[Evaluation]

With respect to each of the No. 1 and No. 2 micro or nano porous membranes, the average thickness, the average equivalent circle diameter of the pores, the area rate of the pores, the permeability index, the Gurley, and the air permeability rate were measured according to the following method. The evaluation results are indicated in Table 1.

(Average Thickness)

The average thickness of the micro or nano porous membrane was measured using a "standard digital thickness gauge (model SMD-565J)" manufactured by TECLOCK Corporation, with an anvil diameter of φ10 mm and measuring power of 1.5 N or less/φ10 mm.

(Average Equivalent Circle Diameter of Pores And Area Rate of Pores)

By the following method, using a surface SEM photograph (dimensions of 2.9 μm×4.2 μm) at a magnification of 10,000 times observed with a scanning electron microscope ("SU8020" manufactured by Hitachi High-Tech Corporation) and using image processing software ("WinROOF2015" manufactured by MITANI Corporation), the areas of the pores was determined, and the average equivalent circle diameter of the pores and the area rate of the pores were calculated from the value of the areas of the pores.

(Areas of Pores)

Using the above image processing software, the pore portions in the surface SEM photograph at a magnification of 10,000 times were binarized to calculate the areas of the pores.

(Average Equivalent Circle Diameter of Pores)

Using the determined values of the areas of the pores, the average value of all the individual values calculated by "$2\times(\text{pore area}/n)^{1/2}$" was defined as the average equivalent circle diameter (nm) of the pores.

(Area Rate of Pores)

The area rate (%) of the pores was calculated by the "area of the entire pores in the field of view×100/area of the entire field of view" obtained by image processing of the pores.

(Permeability Index)

The permeability index was calculated by "(membrane thickness (μm)×air permeability rate (mL/sec/cm$^2$))/(average equivalent circle diameter of pores (μm))$^2$. The permeability index is an index indicating the magnitude of the porosity, and in a case in which a micro or nano porous membrane having the permeability index of 100 or more is used as a filtration membrane, it is preferable because the flux (flow rate) that permeates the membrane can be increased and a large processing rate can be obtained.

(Gurley)

In accordance with JIS-P8117 (2009), the time required for 100 mL of air to permeate at a membrane effective area of 6.42 cm$^2$ and a differential pressure of 1.22 kPa was measured with an Oken-type tester to obtain the value of Gurley.

(Air Permeability Rate)

The air permeability was calculated from the value of the Gurley measured as described above.

TABLE 1

| MICRO OR NANO POROUS MEMBRANE | No. 1 | No. 2 |
|---|---|---|
| MATERIAL FLUORORESIN PARTICLES | CORE-SHELL PARTICLES (A) | FLUORORESIN PARTICLES (B) |
| STRETCHING CONDITIONS | 15° C., 2.0-FOLD STRETCH | 15° C., 2.0-FOLD STRETCH |
| AVERAGE THICKNESS (μm) | 47 | 19 |
| AVERAGE EQUIVALENT CIRCLE DIAMETER OF PORES (nm) | 246 | 318 |
| AREA RATE OF PORES (%) | 2.01% | 1.77% |
| GURLEY (SECONDS) | 21 | 889 |
| AIR PERMEABILITY RATE (mL/sec/cm$^2$) | 0.74 | 0.02 |
| PERMEABILITY INDEX | 578 | 3 |

From the results in Table 1, it can be seen that the permeability index of the No. 1 micro or nano porous membrane having the structure described above was larger than that of the No. 2 micro or nano porous membrane not having the structure described above.

The invention claimed is:

1. A micro or nano porous membrane composed of a stretched membrane obtained by stretching a non-porous membrane material of fluororesins,
    wherein the non-porous membrane material of the fluororesins is a sintered body obtained by shaping a plurality of core-shell particles containing the fluororesins into a membrane, and by sintering the plurality of core-shell particles by heating the membrane obtained by the shaping to its melting point or more,
    wherein the core-shell particles include cores and shells covering outer surfaces of the cores,
    wherein an average particle size of the core-shell particles before being sintered is greater than or equal to 100 nm and less than or equal to 1,000 nm,
    wherein a ratio of a volume of the shells to a volume of the cores in the core-shell particles before being sintered is greater than or equal to 2/98 and less than or equal to 50/50,
    wherein a fluororesin of the cores is a tetrafluoroethylene-hexafluoropropylene copolymer or a combination of the tetrafluoroethylene-hexafluoropropylene copolymer and a tetrafluoroethylene-perfluoroalkyl vinyl ether copolymer, and a fluororesin of the shells is polytetrafluoroethylene, wherein the tetrafluoroethylene-hexafluoropropylene copolymer does not include any monomer other than tetrafluoroethylene and hexafluoropropylene, wherein the tetrafluoroethylene-perfluoroalkyl vinyl ether copolymer does not include any monomer other than tetrafluoroethylene and perfluoroalkyl vinyl ether, wherein a first heat of fusion of the fluororesins in the core-shell particles is less than or equal to 68 J/g, and a Gurley in the micro or nano porous membrane is 25 seconds or less.

2. The micro or nano porous membrane according to claim 1, wherein a permeability index, represented by (membrane thickness (µm)×air permeability rate (mL/sec/cm$^2$))/(average equivalent circle diameter of pores (µm))$^2$, is greater than or equal to 100.

3. A method of manufacturing a micro or nano porous membrane composed of a stretched membrane obtained by stretching a non-porous membrane material of fluororesins, the method comprising:

shaping a plurality of core-shell particles containing the fluororesins into a membrane;

sintering the plurality of core-shell particles by heating the membrane obtained by the shaping to its melting point or more to obtain a sintered body, which is the non-porous membrane material of the fluororesins; and stretching the non-porous membrane material of the fluororesins obtained by the sintering, wherein the core-shell particles include cores and shells covering outer surfaces of the cores, wherein an average particle size of the core-shell particles before the sintering is greater than or equal to 100 nm and less than or equal to 1,000 nm, wherein a ratio of a volume of the shells to a volume of the cores in the core-shell particles before the sintering is greater than or equal to 2/98 and less than or equal to 50/50, wherein a fluororesin of the cores is a tetrafluoroethylene-hexafluoropropylene copolymer or a combination of the tetrafluoroethylene-hexafluoropropylene copolymer and a tetrafluoroethylene-perfluoroalkyl vinyl ether copolymer, and a fluororesin of the shells is polytetrafluoroethylene, wherein the tetrafluoroethylene-hexafluoropropylene copolymer does not include any monomer other than tetrafluoroethylene and hexafluoropropylene, wherein the tetrafluoroethylene-perfluoroalkyl vinyl ether copolymer does not include any monomer other than tetrafluoroethylene and perfluoroalkyl vinyl ether, wherein a first heat of fusion of the fluororesins in the core-shell particles is less than or equal to 68 J/g, and a Gurley in the micro or nano porous membrane is 25 seconds or less.

4. The method of manufacturing a micro or nano porous membrane according to claim 3, wherein a permeability index, represented by (membrane thickness (µm)×air permeability rate (mL/sec/cm$^2$))/(average equivalent circle diameter of pores (µm))$^2$, is greater than or equal to 100.

5. A porous resin membrane complex comprising:
a porous support; and
the micro or nano porous membrane according to claim 1 fixed on the support.

6. A filter element comprising: the porous resin membrane complex according to claim 5.

* * * * *